United States Patent
Wang et al.

(10) Patent No.: US 8,762,407 B2
(45) Date of Patent: Jun. 24, 2014

(54) CONCURRENT OLAP-ORIENTED DATABASE QUERY PROCESSING METHOD

(75) Inventors: Shan Wang, Beijing (CN); Yan-Song Zhang, Beijing (CN)

(73) Assignee: Renmin University of China, Beijing (CN)

(*) Notice: Subject to any disclaimer, the term of this patent is extended or adjusted under 35 U.S.C. 154(b) by 0 days.

(21) Appl. No.: 13/514,293

(22) PCT Filed: May 16, 2012

(86) PCT No.: PCT/CN2012/075620
§ 371 (c)(1),
(2), (4) Date: Jun. 6, 2012

(87) PCT Pub. No.: WO2013/155751
PCT Pub. Date: Oct. 24, 2013

(65) Prior Publication Data
US 2013/0275364 A1    Oct. 17, 2013

(51) Int. Cl.
*G06F 17/30* (2006.01)
(52) U.S. Cl.
USPC ............ 707/769; 707/600; 707/E17.014
(58) Field of Classification Search
CPC .......... G06F 17/30592; G06F 17/30563; G06F 17/30569
USPC ........... 707/602, 600, 769, 999.002, E17.14
See application file for complete search history.

(56) References Cited

U.S. PATENT DOCUMENTS

| | | | |
|---|---|---|---|
| 5,903,888 A * | 5/1999 | Cohen et al. ........................ 1/1 |
| 5,960,428 A * | 9/1999 | Lindsay et al. ..................... 1/1 |
| 6,289,334 B1 * | 9/2001 | Reiner et al. ...................... 1/1 |
| 6,564,212 B2 * | 5/2003 | Koskas ........................ 707/603 |
| 6,618,729 B1 * | 9/2003 | Bhashyam et al. ................. 1/1 |
| 6,711,563 B1 * | 3/2004 | Koskas ........................ 707/769 |
| 7,092,954 B1 * | 8/2006 | Ramesh ........................ 707/714 |
| 7,483,918 B2 * | 1/2009 | Chaudhuri et al. .................. 1/1 |
| 7,752,162 B2 * | 7/2010 | Deshpande et al. ........... 707/600 |
| 8,285,709 B2 * | 10/2012 | Candea et al. ................ 707/714 |
| 2002/0095421 A1 * | 7/2002 | Koskas ........................ 707/100 |
| 2004/0172400 A1 * | 9/2004 | Zarom et al. .................. 707/100 |
| 2007/0282789 A1 * | 12/2007 | Deshpande et al. ............. 707/2 |
| 2008/0215556 A1 * | 9/2008 | Surna et al. ...................... 707/4 |
| 2008/0288524 A1 * | 11/2008 | Dumitru et al. .............. 707/102 |
| 2009/0063855 A1 * | 3/2009 | Parkinson ..................... 713/158 |

(Continued)

OTHER PUBLICATIONS

Candea et al., "A Scalable, Predictable Join Operator for Highly Concurrent Data Warehouses", In Proceedings of the 35th International Conference on Very Large Data Bases (VLDB), Lyon, France, Aug. 2009, 12 pages.*

(Continued)

*Primary Examiner* — Phuong Thao Cao
(74) *Attorney, Agent, or Firm* — Cheng-Ju Chiang (57) ABSTRACT

A concurrent on-line analytical processing (OLAP)-oriented database query processing method is described, for performing, on the basis of predicate vector-based memory OLAP star-join optimization, concurrent OLAP query processing based on a batch query predicate vector bit operation. The concurrent query processing optimization technology is implemented for I/O performance and parallel OLAP processing performance in a database management system, and setting of concurrent OLAP processing load in an optimized way catering to the I/O performance is supported, thereby improving predictable processing performance oriented to diversified OLAP queries and implementing concurrent query star-join bitmap filtering processing based on predicate vector arrays.

11 Claims, 3 Drawing Sheets

(56) References Cited

U.S. PATENT DOCUMENTS

| | | | |
|---|---|---|---|
| 2009/0094191 A1* | 4/2009 | Chaudhuri et al. | 707/2 |
| 2009/0171890 A1* | 7/2009 | Johnson et al. | 707/2 |
| 2010/0293135 A1* | 11/2010 | Candea et al. | 707/602 |
| 2011/0035567 A1* | 2/2011 | Gonion et al. | 712/5 |
| 2011/0040771 A1* | 2/2011 | Gilyadov et al. | 707/754 |
| 2011/0225205 A1* | 9/2011 | Okamoto et al. | 707/792 |
| 2011/0231389 A1* | 9/2011 | Surna et al. | 707/718 |
| 2012/0054225 A1* | 3/2012 | Marwah et al. | 707/769 |
| 2012/0191950 A1* | 7/2012 | Gonion | 712/214 |
| 2013/0117255 A1* | 5/2013 | Liu et al. | 707/714 |
| 2013/0173528 A1* | 7/2013 | Betawadkar-Norwood et al. | 707/602 |

OTHER PUBLICATIONS

Kalnis et al., "Optimization Algorithms for Simultaneous Multidimensional Queries in OLAP Environments", Lecture Notes in Computer Science, vol. 2114, Springer-Verlag, Berline, Germany, pp. 264-273 (10 pages).*

Kalnis et al., "Multi-Query Optimization for On-line Analytical Processing", Information Systems 28 (2003), pp. 457-473 (17 pages).*

Johnson et al., "Row-Wise Parallel Predicate Evaluation", PVLDB'08, Aug. 23-28, 2008, Auckland, New Zealand, pp. 622-634 (13 pages).*

Pinto et al., "Understanding and Controlling Parallel Query Processing in SQL Server", Microsoft SQL Server 2008 R2, published Oct. 2010, 21 pages.*

Zhao et al., "Simultaneous Optimization and Evaluation of Multiple Dimensional Queries", In SIGMOD International Conference on Management of Data, Seattle, WA, 1998, 12 pages.*

Jiao et al., "CDDTA-JOIN: One-Pass OLAP Algorithm for Column-Oriented Databases", In Web Technologies and Applications. Proceedings of the 14th Asia-Pacific Web Conference (APWeb 2012), Kunming, China, Apr. 11-13, 2012, LNCS 7235, pp. 448-459, 2012.*

* cited by examiner

CONCURRENT OLAP-ORIENTED DATABASE QUERY PROCESSING METHOD

FIELD OF THE INVENTION

The present invention relates to a database query processing method, and more particularly to a method for using a batch bit processing technology of predicate vectors to reduce the cost of a star-join in concurrent on-line analytical processing (OLAP) and improve concurrent query processing capabilities, which belongs to the technical field of database management.

BACKGROUND OF THE INVENTION

At present, data processing can be roughly divided into two categories: on-line transaction processing (OLTP) and on-line analytical processing (OLAP). OLTP is mainly daily transaction processing, for example, bank transactions. The design of OLAP aims to satisfy specific query and reporting requirements in decision support or multidimensional environment. Numerous applications including OLAP drive the emergence and development of a data warehouse technology, and the data warehouse technology, in turn, promotes the development of the OLAP technology.

Input/output (I/O) is the biggest performance bottleneck in OLAP. When concurrent queries access a fact table on a disk separately, a large amount of random access produces a huge disk seek latency, greatly reducing the effective throughput of the disk. Currently, the mainstream technology of concurrent query processing is sharing I/O access of a fact table on a slow disk and eliminating the contention of different query processing tasks for disk access. In this process, the technical key is building a concurrent query processing cost model on the shared I/O and obtaining optimum load matching between an I/O latency and a concurrent query processing latency of cached data. However, a complex star-join operation exists in OLAP, so that the overall execution time of concurrent query processing is hard to predict due to different queries, and a unified concurrent query processing cost model cannot be obtained. In addition, in a conventional disk database, dimension tables and a temporary data structure such as a HASH table involved in the query processing also require disk access, which further degrades the disk I/O performance.

In the case of shared I/O, concurrent query processing faces three key technical challenges. The first challenge is migrating data required by dimension tables to a memory in the query processing so as to eliminate or reduce I/O contention due to fact table scan. The second challenge is designing OLAP query processing algorithms in an optimized way, researching a technology of predictable query processing with constant execution time for diversified queries of different selectivities, different numbers of dimension table joins, and different query parameters, and eliminating performance difference between different queries. The third challenge is building a reliable concurrent query processing cost model of shared I/O, setting a reasonable concurrent query load according to a database storage model (row store, column store) and disk I/O performance (disk, SSD, RAID), and optimizing system resources.

A representative solution (IBM BLINK) of the predictable query processing technology is pre-joining and compressing a dimension table and a fact table through denormalization, so as to convert a star-join operation in OLAP into bit operation-based filtering and aggregate processing on row compressed data, in which each record has the same filtering cost, thereby being capable of achieving query processing performance close to constant. The technical solution is applicable to a data warehouse in a completely read-only mode. However, for currently increasing operational OLAP processing, the cost of storage space of materialized data and cost of full data reconstruction caused by dimension table update affect the feasibility of the technical solution. In addition, reference integrity constraints between fact table records and dimension table records cause a large amount of repeated data in materialization of the dimension table, and a large amount of duplicated data corresponding to the same dimension table primary key requires a lot of duplicated predicate calculation in a materialized table, thereby reducing the central processing unit (CPU) efficiency.

Another representative technical solution of the predictable query processing technology is CJOIN, that is, converting a dimension table into a shared HASH filter and adding a concurrent query predicate result vector to each record in the HASH filter to mark query predicate expressions satisfied by the record. When a star-join operation in OLAP is performed, each record in a fact table is pushed into each HASH filter in turn, queries satisfying all predicate conditions are selected through an AND bit operation of a query bit vector, and a result set is distributed to an aggregator corresponding to each query, so as to complete group-by aggregate calculation. This technical solution requires generation of a public HASH table on each dimension table for a query group. Each query has different selectivity and group-by attribute, so the public HASH table contains a large number of dimensional attributes, the HASH table also has a lot of records, and the HASH table may even need to store all dimension table records. Such expansion of the public HASH table causes higher cost of HASH filtering (HASH-join), greater possibility of requiring disk exchange for the HASH table, degraded average performance of queries, and difficulty in predicting the performance of each HASH filter. When the query selectivity is low, a large amount of data needs to be transferred between the HASH filters in a group query, and data also needs to be transferred between the HASH filters even when final query bit vectors are all zero. However, actually only queries corresponding to non-zero positions in query bit vector results need to use all the data transferred between the HASH filters, resulting in great memory bandwidth waste.

SUMMARY OF THE INVENTION

The objective of the present invention is to provide a concurrent OLAP-oriented database query processing method, which uses a batch bit processing technology of predicate vectors to reduce the cost of a star-join in concurrent OLAP, thereby improving concurrent query processing capabilities.

According to the above objective, the present invention adopts the following technical solution.

A concurrent OLAP-oriented database query processing method is provided, for performing, on the basis of predicate vector-based memory OLAP star-join optimization, concurrent OLAP query processing based on a batch query predicate vector bit operation, which is characterized as follows.

The predicate vector-based memory OLAP star-join optimization includes the following steps: loading a dimension table in a memory; vectorizing a predicate operation result in a query; completing a filtering operation for a multi-table star-join through a bit operation on predicate vectors of multiple query-related dimension tables, so as to select a fact table record satisfying a condition; and mapping a dimension table primary key to a memory offset address of a memory column-stored dimensional attribute vector so as to implement direct access to a dimension table group-by attribute value.

The concurrent OLAP query processing based on the batch query predicate vector bit operation includes the following steps: grouping concurrent queries in a designated time window, and performing the queries in a batch processing manner; using a multi-bit predicate vector to store a predicate operation result of a concurrent query group, in which each bit of each data item of the predicate vector corresponds to a designated query predicate operation result flag bit; performing a bit operation in a unit of the multi-bit predicate vector when a star-join bitmap filtering operation is performed, in which a position of 1 in an operation result represents a query number satisfying predicate conditions in all dimension tables; and invoking a HASH aggregate processing thread corresponding to 1 in bits of a predicate vector result to complete iterative aggregate calculation on a current fact table record.

Preferably, in the case of insufficient memory capacity, the dimension table is memorized according to the following priority: group-by attributes→predicate operation attributes→all dimensional attributes.

The group-by attributes and the predicate operation attributes are loaded in an incremental manner in query processing, and in memory dimensional attribute management, a dimensional attribute column with low access frequency is eliminated according to a least recently used (LRU) policy to accommodate a new dimensional attribute column.

Preferably, the dimension table, after being loaded into the memory, is converted into a memory dimensional attribute array, array subscripts are one-to-one corresponding to dimension table primary key values, and a foreign key of a fact table is directly mapped to a subscript of the dimensional attribute column.

A predicate vector is preset for each dimension table, content of the predicate vector is updated when a predicate operation is performed in each query, and a satisfaction state of each dimension table record with a current query predicate is marked by 1 or 0.

Preferably, the foreign key of the fact table is mapped to a designated bit in a predicate vector bitmap, and then a bit operation is performed on bit data of multiple predicate vectors, so as to complete filtering determination on a star-join result of multiple dimension tables.

Preferably, a multi-bit predicate vector is preset according to the number of concurrent query tasks, in which a position of a bit in the predicate vector represents a query number of the concurrent query, and after a predicate operation is completed for a query in the query group, a predicate operation result is recorded at a position corresponding to the query number in each multi-bit vector unit of a predicate vector array.

Preferably, for each sequentially scanned fact table record, a designated unit in a predicate vector array of a corresponding dimension table is located directly according to a foreign key value, and then a bit operation is performed on data of the designated unit in the predicate vector array of each dimension table to obtain a global concurrent query join filtering result.

Preferably, a HASH aggregate processing thread of a corresponding query is invoked according to a position of 1 in a bit string of the global concurrent query join filtering result, and parallel HASH aggregate calculation is performed on the current fact table record according to a dimension table group-by attribute value extracted in real time.

In the parallel HASH aggregate calculation, a HASH aggregate processing thread is allocated for each query, and a HASH aggregate table is created in the thread; multiple HASH aggregate processing threads share a processing core of a multi-core processor, and an operating system allocates processing core resources dynamically for each HASH aggregate processing thread.

Or, in the parallel HASH aggregate calculation, a unified HASH aggregate processing interface is set for each concurrent query group, and a HASH aggregate table is set for each query in a unified concurrency query processing thread, so as to process HASH aggregate calculation in a unified way.

Compared with the prior art, the present invention has the following beneficial effects.

1. A pipeline mode of predicate vectors is employed for a multi-table join of OLAP, without producing any intermediate join result.

2. Key value-address mapping is employed to ensure predictable performance of a join operation and support a late materialization access policy for group-by attributes.

3. A join processing process of concurrent OLAP is implemented through a serial bit operation on a predicate vector array, the number of group-by aggregate operations is reduced due to the overall low selectivity of query, and the CPU efficiency of concurrent query processing is improved.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

As described above, no reliable concurrent query processing cost model of shared I/O exists in the prior art, so optimized design cannot be performed for different storage models and hardware settings. Accordingly, the present invention provides a concurrent OLAP-oriented database query processing method (referred to as a DDTA-CJOIN method for short). The DDTA-CJOIN method is especially suitable for use in a multi-core processor platform, includes technical contents in two aspects, namely, predicate vector-based memory OLAP star-join optimization and concurrent OLAP query processing based on a batch query predicate vector bit operation, and specifically includes technical measures of vectorizing a multi-table join operation of OLAP, completing parallel star-join processing and subsequent HASH group-by aggregate processing through a bit operation of concurrent query vector units, and so on. Detailed illustration is provided below.

Figure 1:
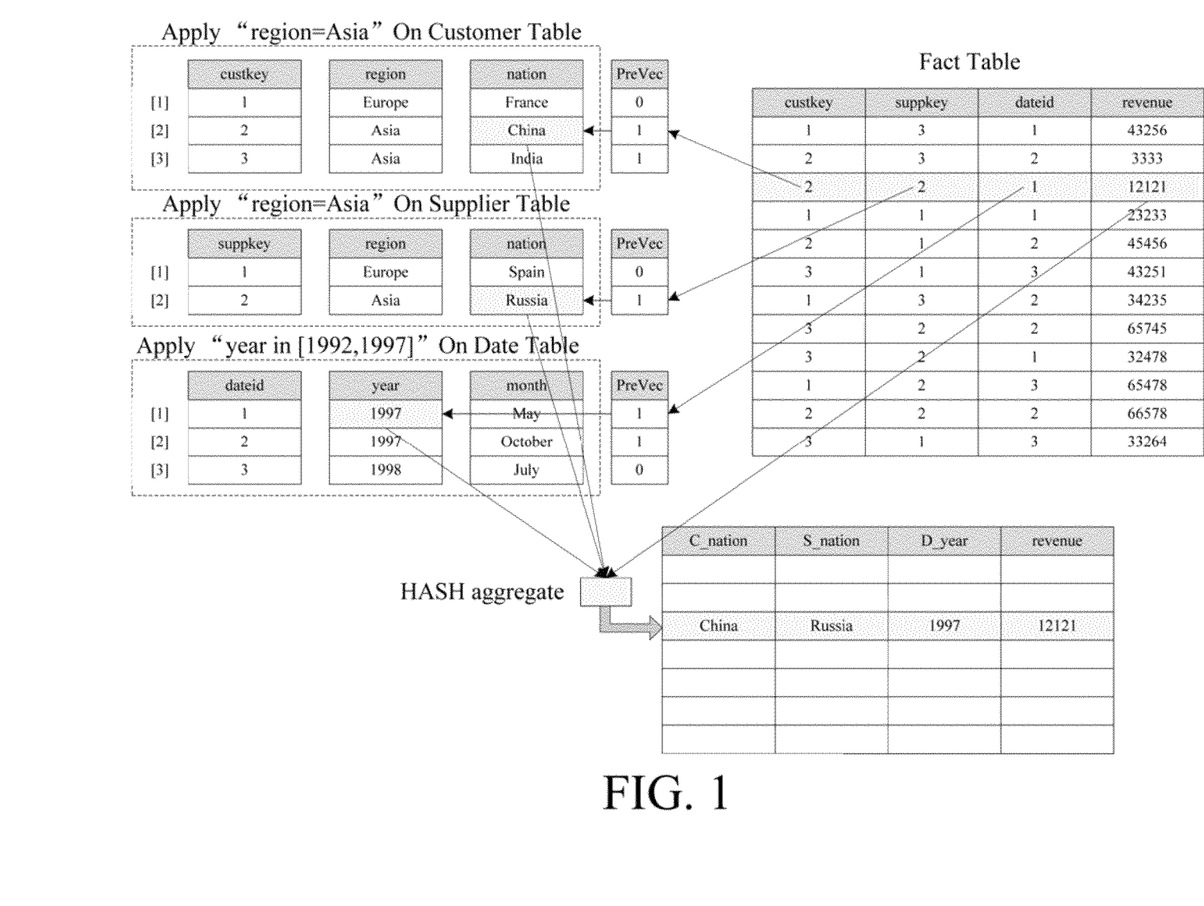
FIG. 1 is a schematic view of predicate vector-based memory OLAP star-join optimization.

FIG. 1 is a schematic view of predicate vector-based memory OLAP star-join optimization in the present invention. The predicate vector-based memory OLAP star-join optimization technology is used for providing predictable OLAP query processing performance based on a memory storage structure, and includes a dimension table column store technology, a predicate vector technology, a star predicate vector bitmap filtering technology, and a dimensional attribute address mapping and direct access technology. The dimension table column store technology is used for managing column-stored dimension tables in main memory; the predicate vector technology is used for vectorizing a predicate operation result in a query; the star predicate vector bitmap filtering technology means that a filtering operation for a multi-table star-join is completed through a bit operation on predicate vectors of multiple query-related dimension tables, so as to select a fact table tuple satisfying a condition; and the dimensional attribute address mapping and direct access technology means that a dimension table primary key is mapped to a memory offset address of a memory column-stored dimensional attribute so as to implement direct access to a dimension table group-by attribute value. The specific illustration is as follows.

(1) Dimension Table Column Store Management

A Dimension table is stored in a disk database, and a memory loading policy of the dimension table is selected according to a size of the dimension table and an available capacity of main memory in query processing.

1) If the memory is large enough, the dimension table is fully loaded into the memory. Row/column conversion of disk storage and memory storage is completed in the process of loading, and the dimension table is stored in a column store model of a memory array structure. Each dimension table has an independent entry address, so that any data item of a dimensional attribute column can be accessed through an offset address.

2) If the memory capacity is not large enough to accommodate all dimension table tuples, the dimension table is memorized according to the following priority: group-by attributes→predicate operation attributes→all dimensional attributes.

A data compression technology may be applied when dimensional attributes are stored in a memory column so as to further reduce memory consumption. The group-by attributes and the predicate operation attributes may be loaded in an incremental manner in query processing, and in memory dimensional attribute management, a dimensional attribute column with low access frequency is eliminated according to an LRU policy to accommodate a new dimensional attribute column (2) Predicate Vector Management Predicate vector management means that an additional bitmap is generated for each dimension table to record a result of action of a predicate expression on each tuple of a current dimension table, in which 1 represents satisfaction with all predicates, 0 represents dissatisfaction, and the length of the bitmap is the same as the number of rows of the dimension table.

As shown in FIG. 1, the dimension table, after being loaded into the memory, is converted into a memory dimensional attribute array, array subscripts are one-to-one corresponding to dimension table primary key values, and a foreign key of a fact table is directly mapped to a subscript of the dimensional attribute column. A predicate vector (PreVec) is preset for each dimension table, content of the predicate vector is updated when a predicate operation is performed in each query, and a satisfaction state of each dimension table record with a current query predicate is marked by 1 and 0.

The predicate vector of the dimension table may serve as an additional structure of the dimension table for reuse in a query, that is, it is only necessary to update bitmap content of the predicate vector for a new query without the need of generating a new predicate vector for each query.

It should be noted herein that, the vector in the present invention is equivalent to a dynamic array, having basically the same meaning (3) Star Predicate Vector Bitmap Filtering For a memory dimensional attribute column and a predicate vector, a dimension table primary key is mapped to a subscript of a dimensional attribute array or bitmap through key value-address mapping. The technical support is that a dimension table employs a surrogate key structure, and a natural sequence 1, 2, 3, . . . is used as dimension table primary keys, a dimension table not satisfying requirements of surrogate keys may be converted in the process of data extract, transform, load (ETL) to serve as a constraint of a basic mode in OLAP processing. Star predicate vector bitmap filtering means that a foreign key of a fact table tuple is mapped to a designated bit in a predicate vector bitmap, and then an AND bit operation is performed on bit data of multiple predicate vectors, so as to complete filtering determination on a star-join result of multiple dimension tables. The predicate vectors are stored in a bitmap, so the data volume is small and capable of satisfying requirements of a caching operation. Therefore, the access sequence of predicate vectors does not affect the performance of star predicate vector bitmap filtering.

(4) Dimensional Attribute Address Mapping and Direct Access

According to characteristics of surrogate keys, a group-by dimensional attribute column may be directly accessed according to an offset address of a memory dimensional attribute array mapped to by a foreign key value of the fact table. Therefore, in OLAP query processing, by using a policy of private predicate vectors and a shared group-by dimensional attribute column, an early materialization policy in a conventional HASH-join can be improved to first performing a join operation of star predicate vector bitmap filtering and then performing a late materialization group-by aggregate policy, thereby ensuring fact table records satisfying all join filtering conditions and the access to dimension table group-by attributes only in the final stage.

(5) HASH Group-by Aggregate

An extracted dimension table group-by attribute and a fact table measure attribute are combined into a query result tuple, and aggregate calculation is performed through a HASH aggregator.

Referring to FIG. 1, based on the above memory OLAP star-join optimization technology, the process of OLAP query processing is divided into three stages: (1) a foreign key of a fact table record is mapped to a predicate vector to complete star-join bitmap filtering. For example, three foreign key values 2, 2, 1 in a fact table tuple [2, 2, 1, 12121] are respectively mapped to the $2^{nd}$, $2^{nd}$, and $1^{st}$ bits of predicate vectors in dimension tables customer, supplier, date, and an AND bit operation is performed on bit data in the three positions (1 AND 1 AND 1). (2) If the result is 0, the subsequent processing is skipped, and the next fact table tuple is processed; if the bit operation result is 1, units with subscripts of 2, 2, and 1 in group-by dimensional attribute columns c_nation, s_nation, d_year are directly accessed through group-by attributes in SQL, a group-by attribute ["China", "Russia", 1997] is extracted and is combined with a measure attribute value 12121 into a query result ["China", "Russia", 1997, 12121]. (3) The query result is pushed to a HASH aggregator, and is mapped to a group-by unit in a corresponding HASH bucket through a HASH function for aggregate calculation.

Figure 2:
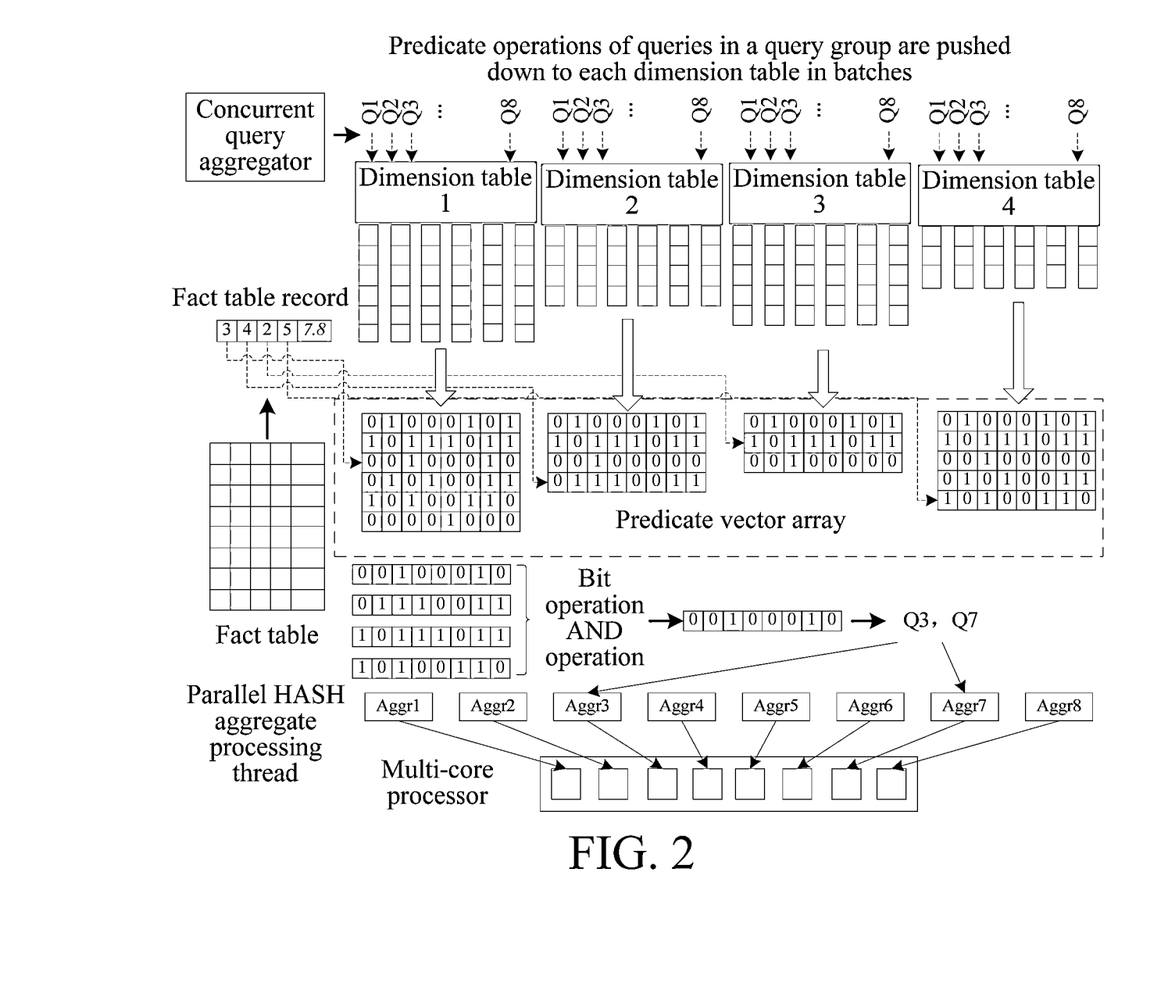
FIG. 2 is a schematic view of concurrent OLAP query processing based on a batch query predicate vector bit operation.

FIG. 2 is a schematic view of concurrent OLAP query processing based on a batch query predicate vector bit operation in the present invention. The concurrent OLAP query processing technology based on the batch query predicate vector bit operation implements concurrent query processing on the basis of a bit operation on a predicate vector array, and specifically includes a concurrent query gathering operation, a predicate vector array, bit operation-based concurrent query star-join bitmap filtering, and parallel HASH aggregate processing. The concurrent query gathering operation is grouping concurrent queries in a designated time window and performing the queries in a batch processing manner. The predicate vector array means that a multi-bit predicate vector is used to store a predicate operation result of a concurrent query group, in which each bit of each data item of the predicate vector corresponds to a designated query predicate operation result flag bit. The bit operation-based concurrent query star-join bitmap filtering means that an AND bit operation is performed in a unit of the multi-bit predicate vector when a star-join bitmap filtering operation is performed, in which a position of 1 in an operation result represents a query number satisfying predicate conditions in all dimension tables. The parallel HASH aggregate processing means that a HASH aggregate processing thread corresponding to 1 in bits of a predicate vector result is invoked to complete iterative aggregate calculation on a current fact table tuple. The specific illustration is as follows.

(1) Sequential Scan or Cyclic Scan of Fact Table

A fact table provides a public data source for all concurrent OLAP query tasks. The concurrent OLAP query tasks may employ aggregate group-by batch processing and may also share fact table scan through independent OLAP processing threads. If the fact table is stored in an external storage device, for example, a disk or a solid state disk (SSD), the I/O operation of shared fact table scan and memory concurrent OLAP processing threads need to be synchronized to ensure matching between I/O data supply speed and CPU data consumption speed.

(2) Concurrent Query Gathering Operation

The concurrent query gathering operation gathers concurrent query tasks in a time window designated by a system and normalizes an OLAP query. As shown in FIG. 2, the concurrent query gathering operation gathers concurrent query tasks and sets a concurrent query group according to a concurrent query gathering window.

As described above, the predicate vector-based memory OLAP star-join optimization technology unifies an OLAP query into three processes including predicate generation, star-join bitmap filtering join, and HASH aggregate. Each OLAP query has completely the same query execution plan, and only content of predicate vectors and group-by attribute parameters in HASH aggregate vary from one another. Therefore, the concurrent query gathering operation does not need to be performed based on query similarity as in the conventional art. Two threads may be set for the concurrent query gathering operation, one for multi-core parallel processing of gathered query tasks, and the other for gathering current query tasks. The roles of gathering operation and execution operation in the two concurrent query gathering operations are dynamically switched after the concurrent queries are completed.

(3) Predicate Vector Array

In the predicate vector array, a multi-bit predicate vector structure is preset according to the number of concurrent query tasks, in which a position of a bit in the predicate vector represents a query number of the concurrent query, and after a predicate operation is completed for a query in the query group, a predicate operation result is recorded at a position corresponding to the query number in each multi-bit vector unit of the predicate vector array 8 queries are taken as an example in FIG. 2. A vector width of a predicate vector array is set according to the number of query tasks. An 8-bit byte array is employed as a predicate vector array in this embodiment. For queries in a concurrent query group, a predicate operation is performed on various dimension tables (dimension table 1-dimension table 4) respectively, and a predicate execution result of each record is recorded in the $i^{th}$ bit of each dimension table, corresponding to the query task number. If no predicate operation is performed on a certain dimension table in the query, the bits of various vector units in a predicate vector array corresponding to the dimension table are marked as 1.

(4) Star-Join Bitmap Filtering of Predicate Vector Array

For each sequentially scanned fact table tuple, a designated unit in a predicate vector array of a corresponding dimension table is located directly according to a foreign key value, and then a bit operation is performed on data of the designated unit in the predicate vector array of each dimension table to obtain a global concurrent query join filtering result.

In the embodiment shown in FIG. 2, the fact table is sequentially scanned. For a current record, for example, [3, 4, 2, 5, 7.8] shown in FIG. 2, the $3^{rd}$, $4^{th}$, $2^{nd}$, and $5^{th}$ vector units in predicate vector arrays (byte arrays) corresponding to four dimension tables are located according to four foreign key attribute values 3, 4, 2, 5. An AND operation in a bit operation is performed on byte data of the four vectors to obtain a global query result vector [00100010]. It is found upon analysis that query Q3 and query Q7 satisfy join bitmap filtering on the current tuple, so query processing threads of Q3 and Q7 are invoked to complete HASH group-by aggregate calculation.

(5) Parallel HASH Aggregate Calculation

HASH aggregate processing threads of corresponding queries are invoked according to positions of 1 in bit string of the global concurrent query join filtering result, and parallel HASH aggregate calculation is performed on the current fact table tuple according to dimension table group-by attribute values extracted in real time.

The parallel HASH aggregate calculation is performed in two manners.

1) A HASH aggregate processing thread is allocated for each query, and a HASH aggregate table is created in the thread. Each thread maintains the HASH aggregate table separately for independent HASH aggregate calculation. Multiple HASH aggregate processing threads share processing cores of a multi-core processor, and an operating system allocates processing core resources dynamically for each HASH aggregate processing thread, as shown in the lower part of FIG. 2. After each fact table tuple is scanned, corresponding HASH aggregate processing threads are invoked dynamically according to positions of 1 in bit string of a global concurrent query join filtering result.

The above manner requires invoking different processing threads for scan of each fact table tuple, resulting in a lot of thread switching operations.

2) A unified HASH aggregate processing interface is set for each concurrent query group, and a HASH aggregate table is set for each query in a unified concurrency query processing thread, so as to process HASH aggregate calculation in a unified way. In the embodiment shown in FIG. 2, 8 HASH aggregate tables are created for 8 queries in a query processing thread of a current query group, and an aggregate calculation result generated by a fact table tuple is sent to a designated HASH aggregate table for aggregate calculation according to positions of 1 in bit string of a join bitmap filtering result in the query processing thread.

The above manner integrates processing of the entire query group into one serial processing thread, so as to configure multiple processing threads in the system to support concurrent query processing with greater granularity in the case that the system can bear a heavy concurrent query load.

Figure 3:
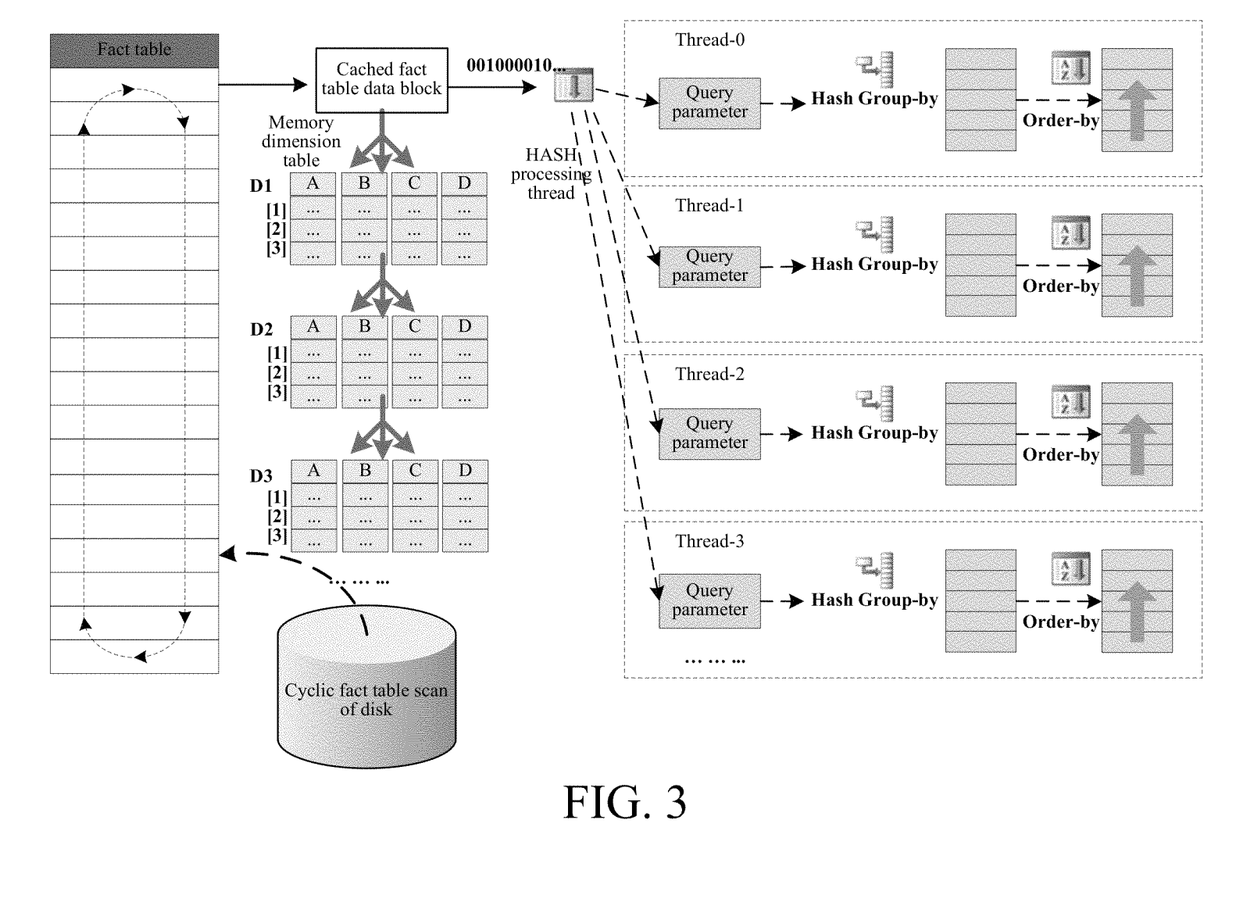
FIG. 3 is a schematic view of concurrent OLAP query processing based on shared fact table scan of a disk.

Referring to FIG. 3, based on shared cyclic fact table scan of a disk, data blocks of a fact table are cached in a memory (corresponding to dimension tables D1, D2, D3, and so on in the memory). It is assumed that an I/O latency is T, and the time for performing concurrent OLAP query processing with the method in the present invention during scan of fact table tuples cached in the memory is t. When T>t, concurrent query tasks may be increased, so as to process as many OLAP query tasks as possible within one fact table I/O latency, thereby achieving balance between CPU performance and I/O performance. When T=t, balanced cost matching is achieved. At this time, the I/O access does not need to wait for synchronization with concurrent threads (for example, thread-0, thread-1, thread-2, thread-3, and so on in FIG. 3), the I/O utilization rate is the highest, and the disk is sequentially accessed continuously.

In practice, the disk I/O latency may be calculated and tested, the execution time of predicate vector-based OLAP query processing is close to constant, and the specific latency may be tested through queries, and in concurrent queries of predicate vector arrays in a query group, the CPU latency of parallel HASH aggregate calculation needs to be estimated according to the selectivity, and then the load intensity of the concurrent queries is calculated according to the I/O latency and the CPU latency.

When a fact table is stored in rows, I/O occurs on a single data file. When a fact table is stored in columns, buffer caches data blocks of relevant columns, and caching of column data needs to adopt different policies according to different column data storage manners. When column data has different data width and compression efficiency, each column data block has a different number of records, so data blocks need to be cached based on the same number of rows as granularity. For example, column blocks corresponding to 4K rows of data are read at a time, in which each column may have a different number of blocks but the same number of row records. Therefore, the different numbers of column blocks are used as a unit for I/O access and caching for shared access of concurrent query processing threads.

Compared with the prior art, the present invention implements the concurrent query processing optimization technology for I/O performance and parallel OLAP processing performance in a database management system, and supports setting of concurrent OLAP processing load in an optimized way catering to the I/O performance, thereby improving predictable processing performance oriented towards diversified OLAP queries and implementing concurrent query star-join bitmap filtering processing based on predicate vector arrays.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A concurrent on-line analytical processing (OLAP)-oriented database query processing method, for performing, on the basis of predicate vector-based memory OLAP star-join optimization, concurrent OLAP query processing based on a batch query predicate vector bit operation, wherein:
the predicate vector-based memory OLAP star-join optimization comprises the following steps: loading a dimension table in a memory; vectorizing a predicate operation result in a query; completing a bitmap filtering operation for a multi-table star-join through a bit operation on predicate vectors of multiple query-related dimension tables, so as to select a fact table tuple satisfying a condition; and mapping a dimension table primary key to a memory offset address of a memory column-stored dimensional attribute so as to implement direct access to a dimension table group-by attribute value; and
the concurrent OLAP query processing based on the batch query predicate vector bit operation comprises the following steps: grouping concurrent queries in a designated time window, and performing the concurrent queries in a batch processing manner; using a multi-bit predicate vector to store a predicate operation result of a concurrent query group, wherein each bit of each data item of the multi-bit predicate vector corresponds to a designated query predicate operation result flag bit; performing a bit operation in a unit of the multi-bit predicate vector when a star-join bitmap filtering operation is performed, wherein a position of 1 in an operation result represents a query number satisfying predicate conditions in all dimension tables; and invoking a HASH aggregate processing thread corresponding to 1 in bits of a predicate vector result to complete iterative aggregate calculation on a current fact table tuple.

2. The concurrent OLAP-oriented database query processing method according to claim 1, wherein:
in the case of insufficient memory capacity, the dimension table is memorized according to the following priority: group-by attributes→predicate operation attributes→all dimensional attributes.

3. The concurrent OLAP-oriented database query processing method according to claim 2, wherein:
the group-by attributes and the predicate operation attributes are loaded in an incremental manner in query processing, and in memory dimensional attribute management, a dimensional attribute column with low access frequency is eliminated according to a least recently used (LRU) policy to accommodate a new dimensional attribute column.

4. The concurrent OLAP-oriented database query processing method according to claim 1, wherein:
the dimension table, after being loaded into the memory, is converted into a memory dimensional attribute array, array subscripts are one-to-one corresponding to dimension table primary key values, and a foreign key of a fact table is directly mapped to a subscript of a dimensional attribute column; and
a predicate vector is preset for each dimension table, content of the predicate vector is updated when a predicate operation is performed in each query, and a satisfaction state of each dimension table tuple with a current query predicate is marked by 1 and 0.

5. The concurrent OLAP-oriented database query processing method according to claim 4, wherein:
the foreign key of the fact table is mapped to a designated bit in a predicate vector bitmap, and then a bit operation is performed on bit data of multiple predicate vectors, so as to complete filtering determination on a star-join result of multiple dimension tables.

6. The concurrent OLAP-oriented database query processing method according to claim 1, wherein:
a multi-bit predicate vector is preset according to a number of concurrent query tasks, wherein a position of a bit in the multi-bit predicate vector represents a query number of a concurrent query, and after a predicate operation is completed for a query in the concurrent query group, a predicate operation result is recorded at a position corresponding to the query number in each multi-bit vector unit of a predicate vector array.

7. The concurrent OLAP-oriented database query processing method according to claim 1, wherein:
for each sequentially scanned fact table tuple, a designated unit in a predicate vector array of a corresponding dimension table is located directly according to a foreign key value, and then a bit operation is performed on data of the designated unit in the predicate vector array of each dimension table to obtain a global concurrent query join filtering result.

8. The concurrent OLAP-oriented database query processing method according to claim 7, wherein:
HASH aggregate processing threads of corresponding queries are invoked according to positions of 1 in a bit string of the global concurrent query join filtering result, and parallel HASH aggregate calculation is performed on the current fact table tuple according to a dimension table group-by attribute value extracted in real time.

9. The concurrent OLAP-oriented database query processing method according to claim 8, wherein:
in the parallel HASH aggregate calculation, a HASH aggregate processing thread is allocated for each query, and a HASH aggregate table is created in the HASH aggregate processing thread; multiple HASH aggregate processing threads share processing cores of a multi-core processor, and an operating system allocates processing core resources dynamically for each HASH aggregate processing thread.

10. The concurrent OLAP-oriented database query processing method according to claim 8, wherein:
in the parallel HASH aggregate calculation, a unified HASH aggregate processing interface is set for each concurrent query group, and a HASH aggregate table is set for each query in a unified concurrency query processing thread, so as to process HASH aggregate calculation in a unified way.

11. A concurrent on-line analytical processing (OLAP)-oriented database query processing method, for performing, on the basis of predicate vector-based memory OLAP star-join optimization, concurrent OLAP query processing based on a batch query predicate vector bit operation, wherein:
the predicate vector-based memory OLAP star-join optimization comprises the following steps: loading a dimension table in a memory, in the case of insufficient memory capacity, the dimension table is memorized according to the following priority: group-by attributes→predicate operation attributes→all dimensional attributes, the group-by attributes and the predicate operation attributes are loaded in an incremental manner in query processing, and in memory dimensional attribute management, a dimensional attribute column with low access frequency is eliminated according to a least recently used (LRU) policy to accommodate a new dimensional attribute column; vectorizing a predicate operation result in a query; completing a bit-map filtering operation for a multi-table star-join through a bit operation on predicate vectors of multiple query-related dimension tables, so as to select a fact table tuple satisfying a condition; and mapping a dimension table primary key to a memory offset address of a memory column-stored dimensional attribute so as to implement direct access to a dimension table group-by attribute value; and
the concurrent OLAP query processing based on the batch query predicate vector bit operation comprises the following steps: grouping concurrent queries in a designated time window, and performing the concurrent queries in a batch processing manner; using a multi-bit predicate vector to store a predicate operation result of a concurrent query group, wherein each bit of each data item of the multi-bit predicate vector corresponds to a designated query predicate operation result flag bit; performing a bit operation in a unit of the multi-bit predicate vector when a star-join bitmap filtering operation is performed, wherein a position of 1 in an operation result represents a query number satisfying predicate conditions in all dimension tables; and invoking a HASH aggregate processing thread corresponding to 1 in bits of a predicate vector result to complete iterative aggregate calculation on a current fact table tuple.

* * * * *